United States Patent [19]

Budinski et al.

[11] 4,046,020
[45] Sept. 6, 1977

[54] WINDSHIELD WIPER DRIVE MECHANISM HAVING A DEPRESSED PARK POSITION

[75] Inventors: John A. Budinski; Raymond A. Flora, both of Dayton, Ohio

[73] Assignee: General Motors Corporation, Detroit, Mich.

[21] Appl. No.: 652,909

[22] Filed: Jan. 28, 1976

[51] Int. Cl.² .............................................. F16H 21/40
[52] U.S. Cl. ..................................... 74/70; 15/250.16
[58] Field of Search .......................... 15/250.16, 250.17; 74/70

[56] References Cited

FOREIGN PATENT DOCUMENTS 956,140   7/1949   France ............................... 15/250.16

Primary Examiner—Samuel Scott
Assistant Examiner—Wesley S. Ratliff, Jr.
Attorney, Agent, or Firm—D. F. Scherer

[57] ABSTRACT

A drive mechanism for windshield wipers in which a rotary input is converted to an oscillating output through a linkage mechanism. The linkage has a drive link which is connected through a control link and cam member to an output link. The cam member maintains one relative position between the control link and the output link during normal wiping and enforces relative angular movement therebetween to another relative position whereby parking of the wipers is accommodated.

2 Claims, 5 Drawing Figures

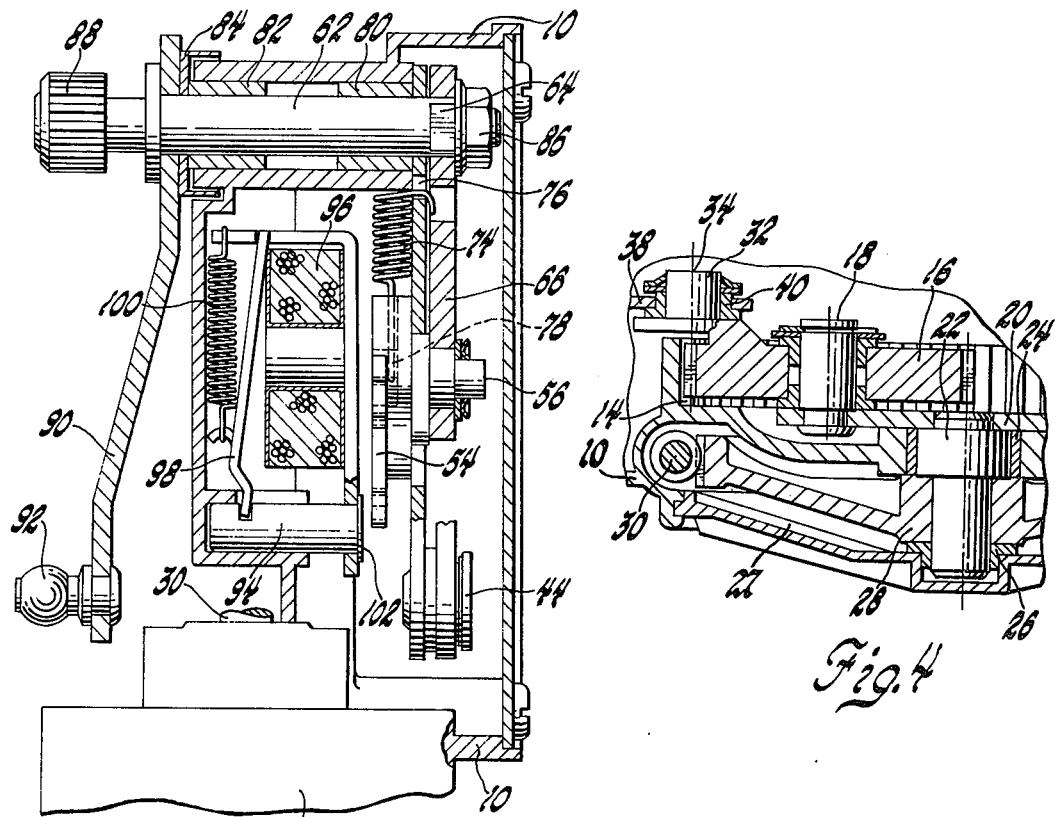
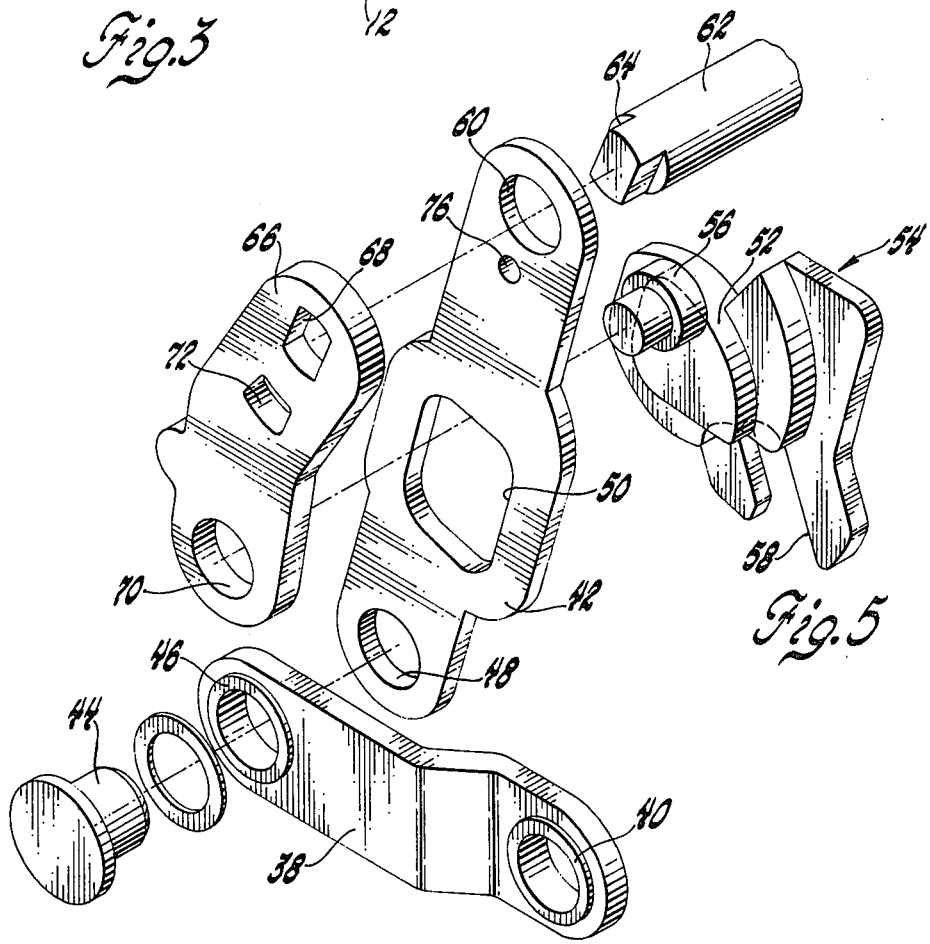

WINDSHIELD WIPER DRIVE MECHANISM HAVING A DEPRESSED PARK POSITION

This invention relates to windshield wiper drive mechanisms and more particularly to drive mechanisms providing an arcuate wipe pattern and a park position outside the arc of the wipe pattern.

Prior art drive mechanisms for windshield wipers provide increased arcuate movement for parking by either changing the throw of the drive crank or changing the effective length of the drive linkage. The present invention effects increased arcuate movement by changing the relative angular position of two link members so that the driven member comes to rest at a position angularly displaced from the normal arcuate wiping pattern. This is accomplished by connecting the two links through a cam member which is selectively actuated to establish the desired angular relations depending on the operating mode which is selected. The linkage is constructed such that interchangeability between depressed park and nondepressed park type mechanisms is simplified. To change from a depressed park to nondepressed park mechanism, the two links and cam are replaced with a single link equal in length to one of the removed links. This permits a minimum of disruptions and confusion when depressed park and nondepressed park mechanisms are manufactured simultaneously on a single production line.

It is an object of this invention to provide an improved drive mechanism for windshield wipers wherein a control link and cam member are disposed between an input link and an output link to produce normal oscillation of the output link during wiping and to enforce movement of the output link beyond the normal wipe pattern for parking of the wipers.

Another object of this invention is to provide in a windshield wiper drive mechanism, having a rotary input and an oscillating output, an improved linkage for controlling the normal wipe oscillation and depressed parking wherein the linkage has an input link operatively connected to the input, an output link drivingly connected to the output, a control link disposed between the input and output for transmitting motion therebetween, and a cam member connected to the output link and disposed in a slot on the control link to maintain one relative position between the control link and output link during wiping oscillations and another relative position therebetween to effect parking.

A further object of this invention is to provide in an improved windshield wiper drive mechanism a linkage disposed between the rotary input and oscillating output members wherein a control link is drivingly connected to the output member through a cam member which is selectively movable to two positions whereby the output member is oscillated through an arcuate wipe pattern when the cam is in one position and the output member is driven to a park position, outside the arcuate pattern, when the cam is in the other position.

These and other objects and advantages of the present invention will be more apparent from the following description and drawings in which:

FIG. 3 is a sectional view taken along line 3—3 of FIG. 1; and

FIG. 4 is a sectional view taken along line 4—4 of FIG. 1; and

FIG. 5 is an exploded view of the linkage used in the drive mechanism.

Figure 1:
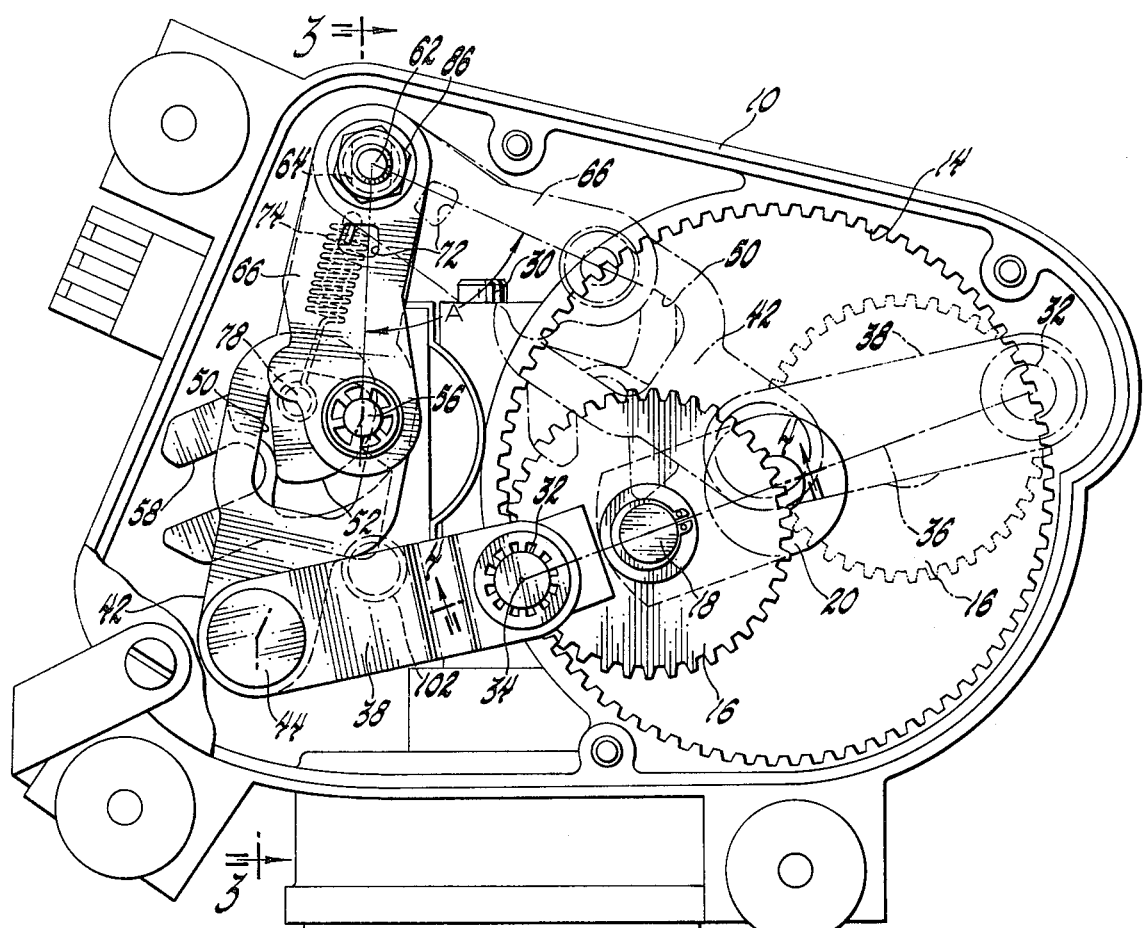
FIG. 1 is a top view of the drive mechanism.

Referring to the drawings, there is seen in FIG. 1 a windshield wiper drive mechanism enclosed in a housing 10 in which housing 10 is also included an electric motor 12. The housing 10 has integrally formed therein or otherwise secured thereto an internally toothed gear 14 which meshes with a pinion gear 16 rotatably supported on a shaft 18 which is secured to an arm 20. The arm 20, as seen in FIG. 4, is secured to a shaft 22 rotatably supported in bearings 24 and 26, in housing 10 and cover 27 respectively, and drivingly connected to a worm gear 28. The worm gear 28 is driven by a worm 30 which is secured to the output shaft of motor 12. This is a conventional worm gear drive arrangement such as that disclosed in U.S. Pat. No. 3,688,332 issued to J. D. Bellware on Sept. 5, 1972, and assigned to the assignee of the present invention. The pinion gear 16 has formed thereon a shaft 32 the axis of which is aligned with the pitch diameter of gear 16. The gears 14 and 16 combine to provide a hypocycloid drive. In this type of drive, when the diameter of gear 16 is equal to the radius of gear 14, the point 34 will traverse a straight line 36 which intersects the center of gear 14 and has its extreme ends at the mesh point between the gears 14 and 16.

A drive link 38 is pivotally connected at one end thereof to the shaft 32 and is separated therefrom by a bearing 40. The other end of link 38 is connected to a control link 42. This is best seen in FIG. 5. The drive link 38 and control link 42 are connected with a shoulder pin 44 which passes through a bearing 46 disposed in link 38 and into an aperture 48 formed in control link 42. The control link 42 has formed therein a cam opening or slot 50 in which is disposed a cam 52 formed on an actuator 54. The actuator 54 also has formed thereon a pin 56 and an actuating slot 58.

The control link 42 has an aperture 60 formed therein through which passes a wiper drive shaft 62. The wiper drive shaft 62 has a flat cut portion 64 to which is secured a driven link 66 which has formed therein an aperture 68 complementary to the flat cut portion 64. The link 66 also has an aperture 70 which is disposed on the pin 56 of actuator 54. Also formed in link 66 is a window or opening 72 which provides clearance about one end of a tension spring 74, which spring 74 is tensed between an opening 76 in link 42 and a pin 78 formed on the actuator 54. This is best seen in FIGS. 1 and 3.

The wiper drive shaft 62 is pivotally disposed in housing 10 on a pair of bearings 80 and 82. The axial location of the shaft 62 is controlled by a thrust bearing 84 and a fastener 86 which is threaded onto the end of shaft 62. The shaft 62 has a knurled head 88 which is adapted to be connected to a conventional windshield wiper. A drive arm 90 is secured to the shaft 62. The drive arm 90 which has secured thereto a ball 92 which permits the arm 90 to be connected to a conventional transmission link thereby driving the other windshield wiper in a two wiper system. This permits the use of the present invention in what is commonly termed a semimodular windshield wiper system wherein one wiper is driven directly by the output shaft in the drive mechanism and the other wiper is driven through the transmission link. This invention could also be used in a two wiper system wherein the two wipers are both driven through transmission links which can be connected to the drive ball 92 or in any of the other conventional type outputs from the windshield wiper drive mechanism.

The slot 58 of cam actuator 54 is adapted to receive a pin 94 which is controlled by a solenoid 96, as best seen in FIG. 3. The pin 94 is connected to a lever 98 which is biased to a position shown in FIG. 3 by a tension spring 100. When the solenoid 96 is energized, the lever 98 is drawn to the solenoid core thereby moving pin 94 to the right as viewed in FIG. 3. When the pin 94 has moved to the right it enters the path of actuator 54 and is engaged in slot 58 as the linkage is moved from the phantom line position toward the full line position shown in FIG. 1. The pin 94 has a head 102 formed thereon which limits leftward movement of the pin 94 under the action of spring 100 and also maintains the pin 94 in engagement with the slot 58 when the solenoid is deenergized with the drive mechanism in the park position which will be described later.

When the electric motor 12 is turned on thereby permitting operation of the windshield wipers, the worm 30 rotates gear 28 which causes rotation of arm 20 and thereby the rotation of the center of pinion 16. Because of the meshing engagement of gears 14 and 16 the point 34 traverses the straight line 36 during the rotation of the center of gear 16 about the axis of shaft 22. The movement of point 34 in a straight line causes the link 38 to be moved therewith such that the link 42 pivots about the center line of drive shaft 62 due to the connection with link 38. The connection between the cam 52, link 42 and link 66 cause the link 66 to oscillate with the control link 42. Since the shaft 62 is drivingly connected with the link 66, the drive shaft 62 and therefore arm 90 also oscillate. The links 42 and 66 and shaft 62 oscillate through an angle A shown in FIG. 1 which is the wipe angle for the wiper system. Therefore the wipers connected to this mechanism oscillate to an angle equal to or proportional to the angle A. This angle is designed to be of sufficient size to permit clearing of the windshield for proper operator vision. During the wiping operation, the solenoid 96 is deenergized and therefore the pin 94 is in the spring-set position.

Figure 2:
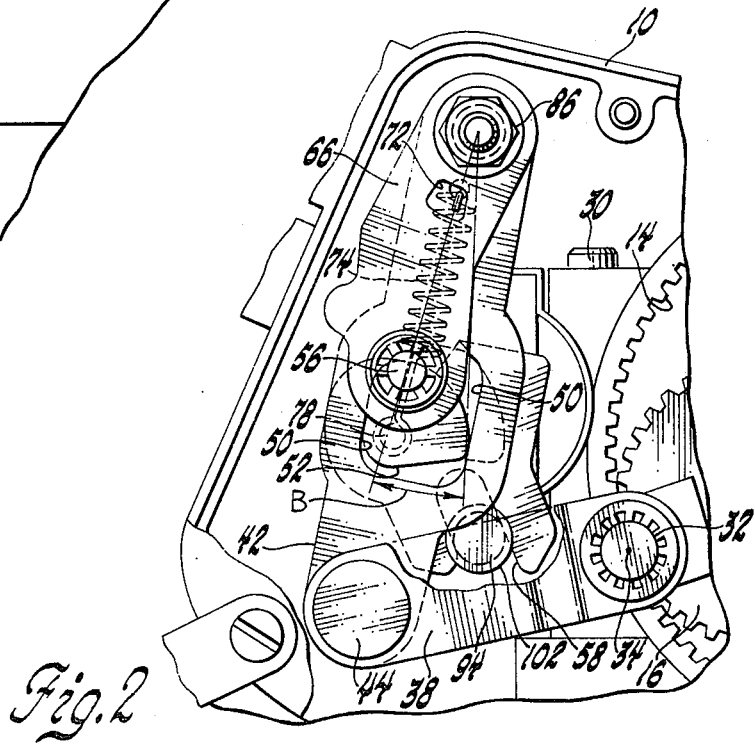
FIG. 2 is a partial top view showing the drive mechanism linkage in the park position.

When it is desired to discontinue operation of the wipers, the system is deenergized. However, as is well known in wiper systems, the drive motor 12 continues to operate. When the wiper system is turned off, the solenoid 96 is energized thereby moving the pin 94 to the right as described above. If the cam actuator 54 should at that instant be aligned under the pin 94, the head 102 of pin 94 prevents sufficient rightward movement of the pin 94 to engage the slot. However, as the linkage oscillates in a counterclockwise direction, as viewed in FIG. 1, the actuator will clear the pin 94 permitting further rightward movement thereof. Upon oscillation of the linkage in a clockwise direction, the pin 94 will engage the slot 58 thereby establishing the pivot point for the cam actuator 54 at the pin 94. When this occurs, the cam 52 will be pivoted in the slot 50 from the position shown in FIG. 1 to a position shown in FIG. 2. This pivoting of the cam 52 causes additional oscillation or pivoting of the link 66 through the angle B which is beyond the limit of the wipe angle A. Thus the wipers are driven through the additional arc B to be placed in the depressed park position out of the vision of the operator. When the wipers reach the park position, the electric motor 12 ceases to operate. This may be controlled by any of the conventional electrical systems currently available and used on windshield wiper systems which utilize a depressed park operation.

When the windshield wipers come to a complete stop the solenoid 96 is deenergized, however, the pin 94 cannot be drawn from the slot 56 because of the enlarged head 102. When it is desired to deactivate the windshield wiper system, the drive motor is energized to operate. This causes counterclockwise pivoting of the linkage. Since the cam actuator is still controlled from a pivotal standpoint by pin 94, the cam 52 is pivoted in the slot 50 until the linkage has accomplished sufficient counterclockwise pivoting to permit the slot 58 to disengage itself with pin 94 whereupon the spring 100 moves the pin 94 to the position shown in FIG. 3. The wipers will then be operated through the wipe angle A until deenergization thereof is desired. The tension spring 74 assists in maintaining the links 42 and 66 and cam actuator 54 in the relative positions shown in FIG. 1, during wipe operation. When the wipers are in the park position shown in FIG. 2, the pin 78 and pin 56 are aligned such that the force of spring 74 does not provide a restoring force to the linkage. The force of the spring 74 is absorbed by the cam surface 52 in the slot 50 at a point which is aligned with the ends of spring 74.

Obviously, many modifications and variations of the present invention are possible in light of the above teaching. It is therefore to be understood, that within the scope of the appended claims the invention may be practiced otherwise than as specifically described.

What is claimed is:

1. A windshield wiper drive mechanism having a normal arcuate wipe pattern and a park position disposed outside the normal arcuate wipe pattern comprising: rotary input means; an output crank arm having one end pivotally mounted on an axis and having an output shaft aligned with said axis; a drive link having one end pivotally connected to said rotary input means; a control link having one end pivotally mounted on said output shaft and being rotatable about the axis of said output shaft relative to said output shaft, the other end pivotally connected to the other end of said drive link, and a cam slot formed therein intermediate the ends; a cam disposed in said cam slot having a pin portion drivingly connected to the other end of said output crank arm and an actuator portion said cam, pin portion and crank arm cooperating to maintain the position of the control link relative to the position of the output shaft and output crank arm and forming a drive connection between said control link and said output shaft so that said output crank arm, said control link and said output shaft are driven through said normal wipe pattern; and actuator means selectively operable to engage said actuator portion for enforcing movement of said cam in said cam slot so that said control link is rotated about said axis for movement relative to both said output crank arm and said output shaft and said output crank arm and output shaft are pivoted on said axis through an arc outside said normal wipe pattern to the park position upon the completion of wiping while the arc of travel of the control link remains unchanged.

2. A windshield wiper drive mechanism comprising: input drive means continuously rotatably driven during wiping; an output shaft normally oscillating through a wipe arc when the input drive means is rotating; a drive link driven by said input means; a control link drivingly connected to said drive link and being rotatable about an axis aligned with said output shaft and being driven during wiping through an arc equal to the wipe arc; an output crank arm secured to said output shaft; a cam member drivingly connecting said control link and said output crank arm and being movable between two positions to maintain the output crank arm and the control link at one position relative to each other during wiping and at another position relative to each other during parking whereby the control link output shaft and crank arm are oscillated on said axis through the wipe arc in one position of the cam and the output shaft and crank arm are oscillated on said axis through an arc outside the wipe arc to a park position in the other position of the cam while the control link is oscillated on said axis through the wipe arc; and actuator means for establishing the cam in the one position when windshield wiping is desired and to the other position when parking of the wipers is desired.

* * * * *